(12) United States Patent
Ishihara et al.

(10) Patent No.: US 11,318,986 B2
(45) Date of Patent: May 3, 2022

(54) STEERING DEVICE

(71) Applicant: KNORR-BREMSE STEERING SYSTEM JAPAN LTD., Saitama (JP)

(72) Inventors: Takuya Ishihara, Kumagaya (JP); Toshiro Yoda, Higashimatsuyama (JP)

(73) Assignee: KNORR-BREMSE STEERING SYSTEM JAPAN LTD., Hiki-gun (JP)

(*) Notice: Subject to any disclaimer, the term of this patent is extended or adjusted under 35 U.S.C. 154(b) by 111 days.

(21) Appl. No.: 16/636,270

(22) PCT Filed: Jul. 26, 2018

(86) PCT No.: PCT/JP2018/028002
§ 371 (c)(1),
(2) Date: Feb. 3, 2020

(87) PCT Pub. No.: WO2019/039183
PCT Pub. Date: Feb. 28, 2019

(65) Prior Publication Data
US 2020/0377147 A1 Dec. 3, 2020

(30) Foreign Application Priority Data
Aug. 25, 2017 (JP) .............................. JP2017-161895

(51) Int. Cl.
*B62D 5/04* (2006.01)
*B62D 3/08* (2006.01)
(Continued)

(52) U.S. Cl.
CPC ............. *B62D 5/0448* (2013.01); *B62D 3/08* (2013.01); *B62D 5/0454* (2013.01);
(Continued)

(58) Field of Classification Search
CPC ...... B62D 5/0448; B62D 3/08; B62D 5/0454; B62D 5/0463; B62D 5/0484; B62D 15/0235
See application file for complete search history.

(56) References Cited

U.S. PATENT DOCUMENTS 8,408,353 B2 * 4/2013 Nagase ................ H02K 7/1166
180/444
8,579,072 B2 * 11/2013 Kodato ................ B62D 5/0463
180/446
(Continued)

FOREIGN PATENT DOCUMENTS

JP S59-70876 U 5/1984
JP H04-90970 A 3/1992
(Continued)

OTHER PUBLICATIONS

International Search Report issued in corresponding application No. PCT/JP2018/028002 dated Oct. 23, 2018 with English translation.
(Continued)

*Primary Examiner* — Minnah L Seoh
*Assistant Examiner* — Michael R Stabley
(74) *Attorney, Agent, or Firm* — Foley & Lardner LLP

(57) ABSTRACT

A steering device includes: a first steering mechanism including a first ball nut steering, and a first motor actuator, the first ball nut steering including a first output shaft, a first ball screw, and a first transmitting mechanism, the first motor actuator arranged to provide a rotation force to the first output shaft, a second steering mechanism including a second ball nut steering, and a second motor actuator, the second ball nut steering including a second output shaft, a second ball screw, and a second transmitting mechanism, the second motor actuator arranged to provide a rotation force to the second output shaft, a connection member arranged to connect the first transmitting mechanism and the second
(Continued)

transmitting mechanism so as to interlock a movement of the first transmitting mechanism and a movement of the second transmitting mechanism.

14 Claims, 6 Drawing Sheets

(51) Int. Cl.
  *B62D 6/04* (2006.01)
  *B62D 15/02* (2006.01)
  *F16H 25/22* (2006.01)
(52) U.S. Cl.
  CPC ......... *B62D 5/0463* (2013.01); *B62D 5/0484* (2013.01); *B62D 6/04* (2013.01); *B62D 15/0235* (2013.01); *F16H 25/2204* (2013.01)

(56) References Cited

U.S. PATENT DOCUMENTS

| | | | | |
|---|---|---|---|---|
| 2007/0131476 A1* | 6/2007 | Kubokawa | ............ | B62D 5/006 180/444 |
| 2013/0233639 A1 | 9/2013 | Kodato | | |
| 2014/0345965 A1 | 11/2014 | Ura | | |
| 2015/0291208 A1* | 10/2015 | Miyasaka | ............ | B62D 5/0484 701/41 |
| 2015/0360715 A1* | 12/2015 | Shimizu | .................. | F16D 27/00 701/43 |
| 2016/0090119 A1 | 3/2016 | Tomizawa | | |

FOREIGN PATENT DOCUMENTS

| | | |
|---|---|---|
| JP | 2002-87311 A | 3/2002 |
| JP | 2005-306317 A | 11/2005 |
| JP | 2006-256559 A | 9/2006 |
| JP | 2011-25857 A | 2/2011 |
| JP | 2013-184622 A | 9/2013 |
| JP | 2014-227042 A | 12/2014 |
| JP | 2016-68583 A | 5/2016 |
| JP | 2017-1611 A | 1/2017 |

OTHER PUBLICATIONS

Written Opinion issued in corresponding application No. PCT/JP2018/028002 dated Oct. 23, 2018 with English translation.

* cited by examiner

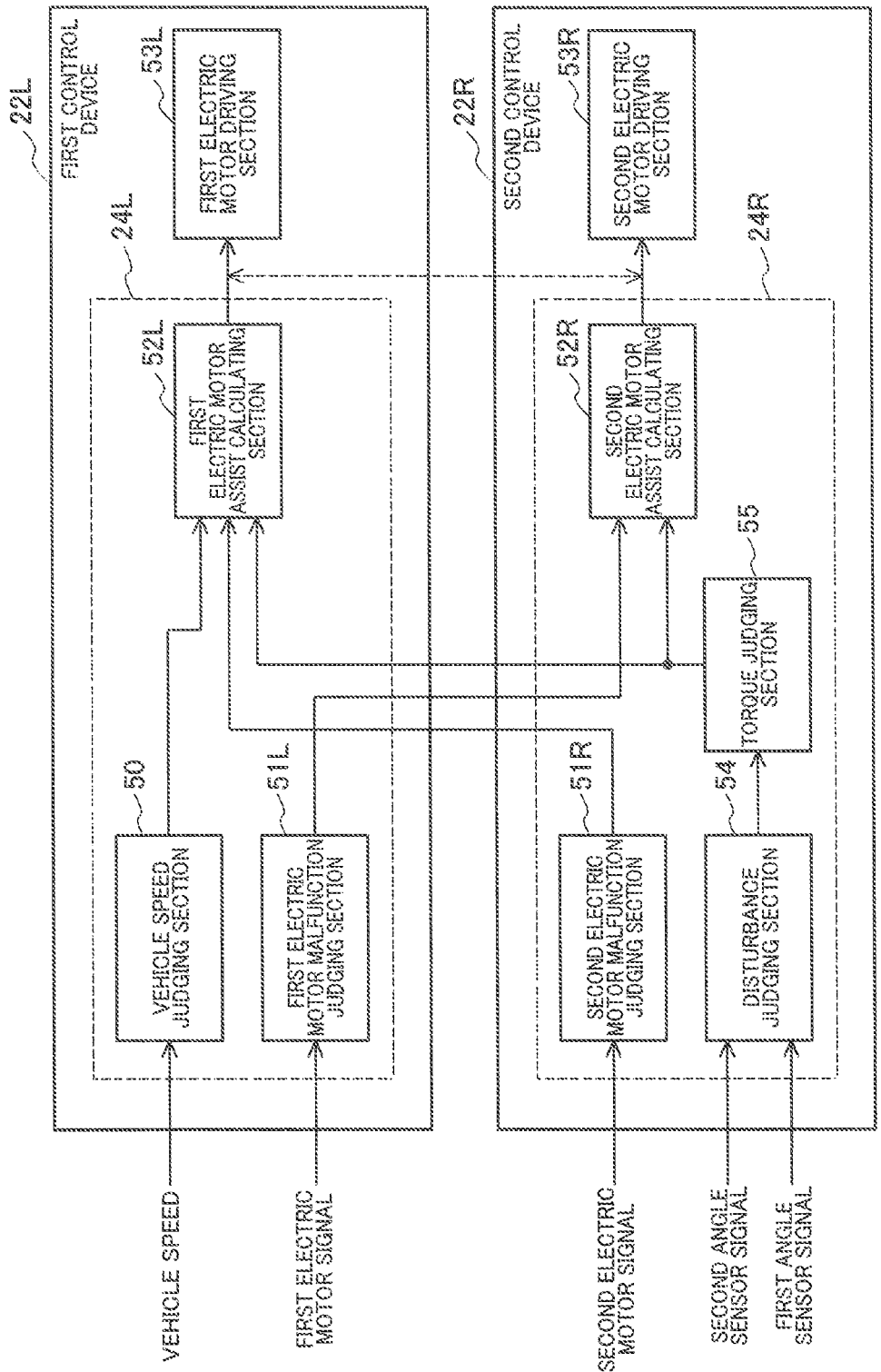

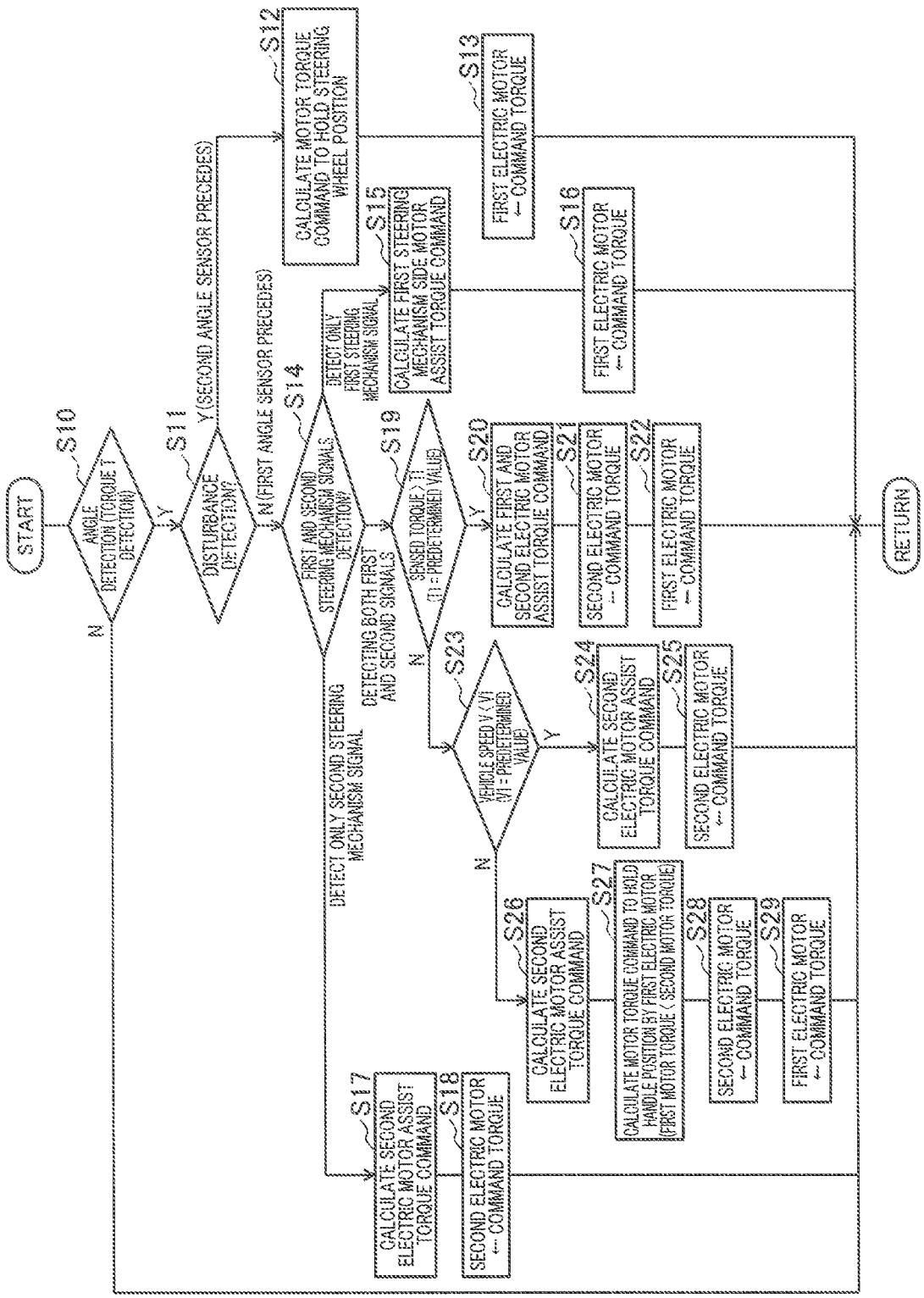

STEERING DEVICE

TECHNICAL FIELD

This invention relates to a steering device arranged to steer a pair of wheels of a vehicle, and more specifically to a steering device including steering mechanisms corresponding to respective wheels.

BACKGROUND ART

A vehicle employs a power steering device for assisting a steering force by a steering wheel (hereinafter, referred to as a steering assist force). In general, this power steering device is arranged to drive a sector gear by a piston arranged to be actuated by a hydraulic pressure, to operate a link system connected to wheels by the sector gear, and to provide the steering assist force.

Moreover, a large steering force is needed in a vehicle such as a track, so that it is necessary to further assist the steering force. Accordingly, it has been proposed to provide the steering assist force by steering mechanisms in which a pair of wheels of a vehicle are hydraulically driven respectively. For example, Japanese Patent Application Publication No. 2002-87311 (Patent Document 1) discloses a configuration in which hydraulically-driven pistons are provided to links connected to the respective wheels, and in which the hydraulic pressures acted to the respective pistons are controlled in accordance with the steering of the steering wheel so as to strengthen the steering assist force. In this case, the hydraulic pressure from the hydraulic pressure pump is controlled by a control valve, and acted through pipes to the respective pistons.

Besides, in the above-described patent document 1, the steering mechanisms corresponding to the respective wheels are provided for increasing the steering assist force. However, the steering mechanisms corresponding to the respective wheels may be provided for other objects except for the above-described object. For example, it is possible to employ the above-described configuration for increasing the response of the steering.

PRIOR ART DOCUMENT

Patent Document

Patent Document 1: Japanese Patent Application Publication No. 2002-87311

SUMMARY OF THE INVENTION

Problems which the Invention is Intended to Solve

In recent years, in the vehicle, it is required to improve the operability of various operation devices for the occupant. The operability of the steering wheel for turning the vehicle is no exception. Accordingly, it is a development object necessary for improving the steering characteristics, to rapidly independently providing the steering assist forces to the respective wheels. An art to attain this development object is strongly required.

It is, therefore, an object of the present invention to provide a new steering device devised to rapidly independently provide steering assist forces to respective wheels so as to improve the steering characteristics.

Means for Solving the Problem

In the present invention, there are provided (1) a first steering mechanism including a first ball nut steering, and a first motor actuator, the first ball nut steering including a first output shaft, a first ball screw, and a first transmitting mechanism, the first output shaft being arranged to be rotated about a rotation axis of the first output shaft, the first ball screw being arranged to drive the first nut so that the first nut is moved in a direction of the rotation axis of the first output shaft in accordance with the rotation of the first output shaft, and the first transmitting mechanism being arranged to turn a first steered wheel in accordance with a movement of the first nut, the first motor actuator being a first electric motor arranged to provide a rotation force to the first output shaft, (2) a second steering mechanism including a second ball nut steering, and a second motor actuator, the second ball nut steering including a second output shaft, a second ball screw, and a second transmitting mechanism, the second output shaft being arranged to be rotated about a rotation axis of the second output shaft, the second ball screw being arranged to drive the second nut so that the first nut is moved in a direction of the rotation axis of the second output shaft in accordance with the rotation of the second output shaft, and the second transmitting mechanism being arranged to turn a second steered wheel in accordance with a movement of the second nut, the second motor actuator being a second electric motor arranged to provide a rotation force to the second output shaft, (3) a connection member arranged to connect the first transmitting mechanism and the second transmitting mechanism so as to interlock a movement of the first transmitting mechanism and a movement of the second transmitting mechanism.

Benefit of the Invention

By the present invention, the different controls are performed, respectively, in the first steering mechanism and the second steering mechanism which are controlled by electric actuators. With this, it is possible to provide arbitrary steering control characteristics, and to improve the steering characteristics.

BRIEF DESCRIPTION OF DRAWINGS

FIG. 5 is a control block diagram showing a configuration of a control device shown in FIG. 1.

FIG. 6 is a control flowchart for explaining an concrete control of the control device shown in FIG. 1.

DESCRIPTION OF EMBODIMENTS

Hereinafter, an embodiment according to the present invention is explained in details with reference to the drawings. However, the present invention is not limited to below-described embodiment. The present invention includes various variations and applications in technical conception of the present invention.

Figure 1:
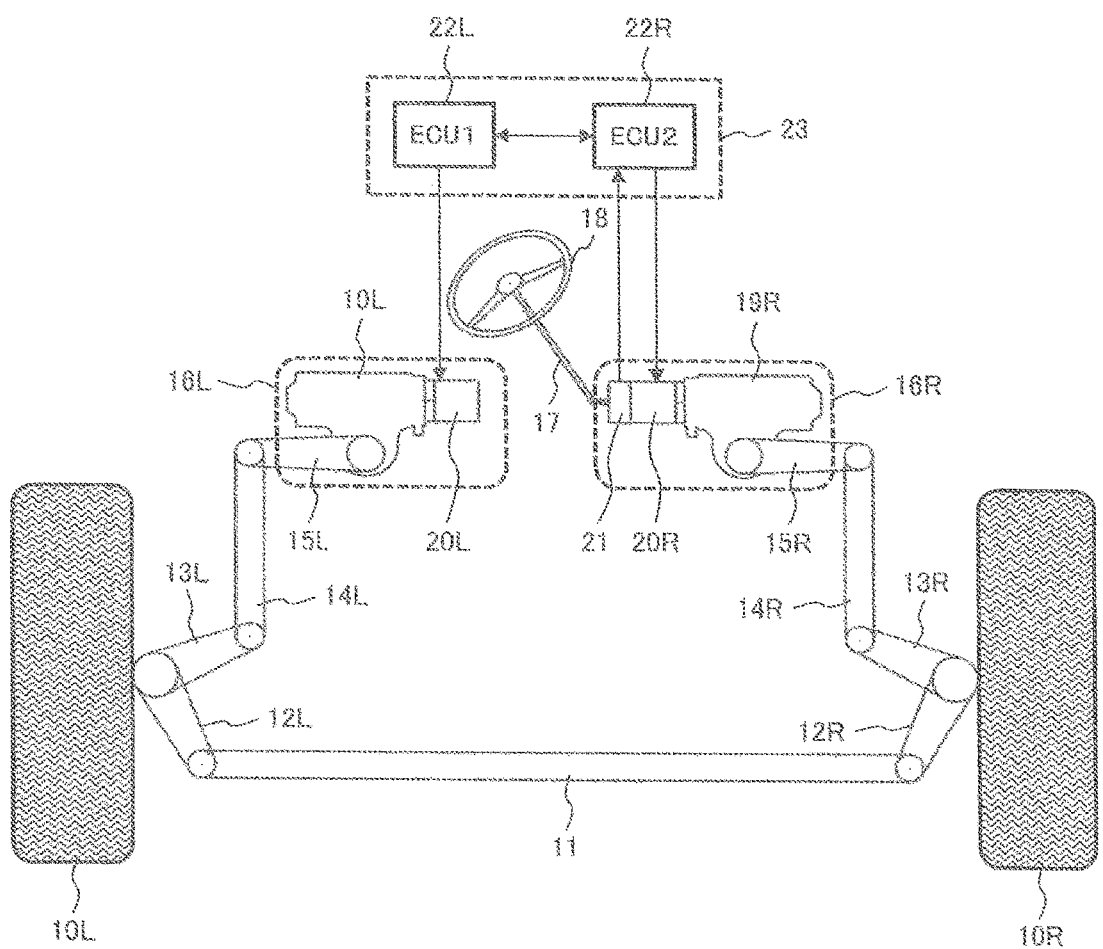
FIG. 1 is a configuration view showing a configuration of a steering system according to an embodiment of the present invention.

FIG. 1 shows a configuration of a steering system according to a representative embodiment of the present invention. Front wheels on a front side of a vehicle are a pair of wheels (hereinafter, referred to as steered wheels) which are a first steered wheel 10L and a second steered wheel 10R. The first steered wheel 10L and the second steered wheel 10R are connected by a tie rod 11.

Respective ends of the tie rod 11 are connected with a first tie rod arm 12L and a second tie rod arm 12R. The first tie rod arm 12L and the second tie rod arm 12R are connected, respectively, with the first steered wheel 10L and the second steered wheel 10R. With these, the first steered wheel 10L and the second steered wheel 10R are interlocked and turned (steered).

Moreover, the first steered wheel 10L is connected through a first steering arm 13L, a first drag link 14L, and a first pitman arm 15L to a first electric steering mechanism 16L. Similarly, the second steered wheel 10R is connected through a second steering arm 13R, a second drag link 14R, and a second pitman arm 15R to a second electric steering mechanism 16R. Hereinafter, the entire of the links and the arms from the first electric steering mechanism 16L and the second electric steering mechanism 16R to the first steered wheel 10L and the second steered wheel 10R may be referred to merely as a link system (=connection member).

The second electric steering mechanism 16R is connected through a steering shaft 17 to a steering wheel 18. By the operation of the steering wheel 18, the second electric steering mechanism 16R is arranged to perform the steering through the pitman arm 15R. In this case, the first electric steering mechanism 16L and the second electric steering mechanism 16R provide the steering assist force as described later.

The first electric steering mechanism 16L includes a first integral type gear box (hereinafter, referred to as a first gear box) 19L; and a first motor actuator 20L arranged to control a ball nut type steering installed in the first gear box 19L.

Similarly, the second electric steering mechanism 16R includes a second integral type gear box (hereinafter, referred to as a second gear box) 19R; and a second motor actuator 20R arranged to control a ball nut type steering installed in the second gear box 19R. Besides, a torque sensor 21 is provided to the second electric steering mechanism 16R. The torque sensor 16R is arranged to sense the operation torque of the steering wheel 18.

The first motor actuator 20L of the first electric steering mechanism 16L is controlled by a first control device 22L. Similarly, the second motor actuator 20R of the second electric steering mechanism 16R is controlled by a second control device 22R. The first control device 22L and the second control device 22R are communicated with each other through communication lines to exchange control information, and malfunction and abnormality information.

Besides, an integral control device 23 may constitutes the first control device 22L and the second control devise 22R so as not to separate the first control device 22L and the second control device 22R. In this case, the integral control device 23 can control the first electric steering mechanism 16L and the second electric steering mechanism 16R. Moreover, the first control device 22L may be constituted as a mechatronical integration (an integral device including a mechanical device and an electric device) by integrally assembling the first control device 22L to the first electric steering mechanism 16L. Moreover, the second control device 22R may be constituted as a mechatronical integration (an integral device including a mechanical device and an electric device) by integrally assembling the second control device 22R to the second electric steering mechanism 16R.

In this way, the first electric steering mechanism 16L is provided with the first motor actuator 20L. The second electric steering mechanism 16R is provided with the second motor actuator 20R. Moreover, the first electric steering mechanism 16L and the second electric steering mechanism 16R are independently controlled by the respective control devices 22L and 22R.

Accordingly, it is possible to provide arbitrary steering control characteristics to the first electric steering mechanism 16L and the second electric steering mechanism 16R by performing different controls to the first electric steering mechanism 16L and the second electric steering mechanism 16R. Consequently, it is possible to improve the steering characteristics. Moreover, the respective motor actuators 20L and 20R are configured to produce steering assist forces. With this, the steering assist force is large. The response is rapid. Therefore, it is possible to further improve the above-described steering control characteristics.

Figure 2:
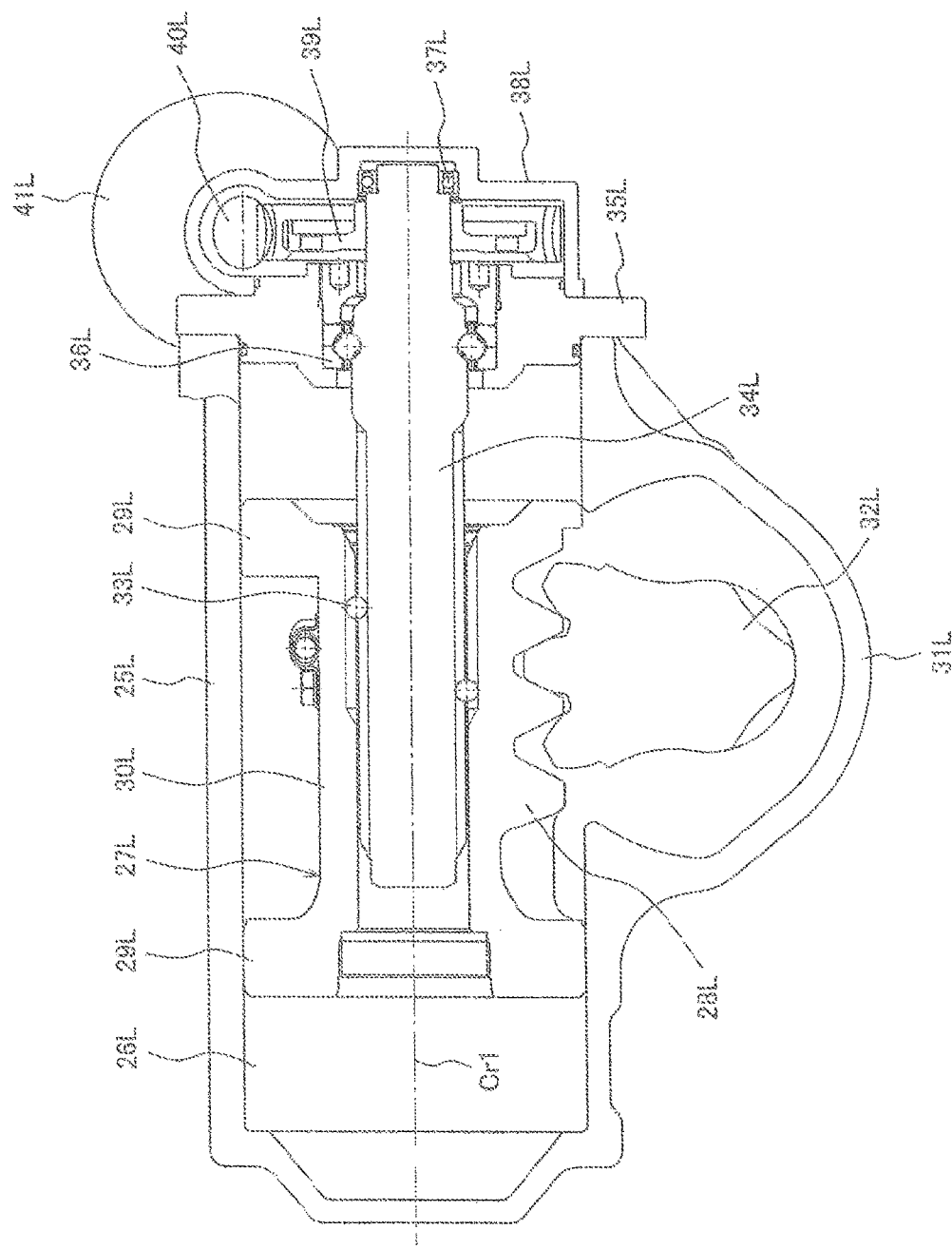
FIG. 2 is a sectional view showing a configuration of an electric steering mechanism on a side which is not connected to the steering wheel.
Figure 3:
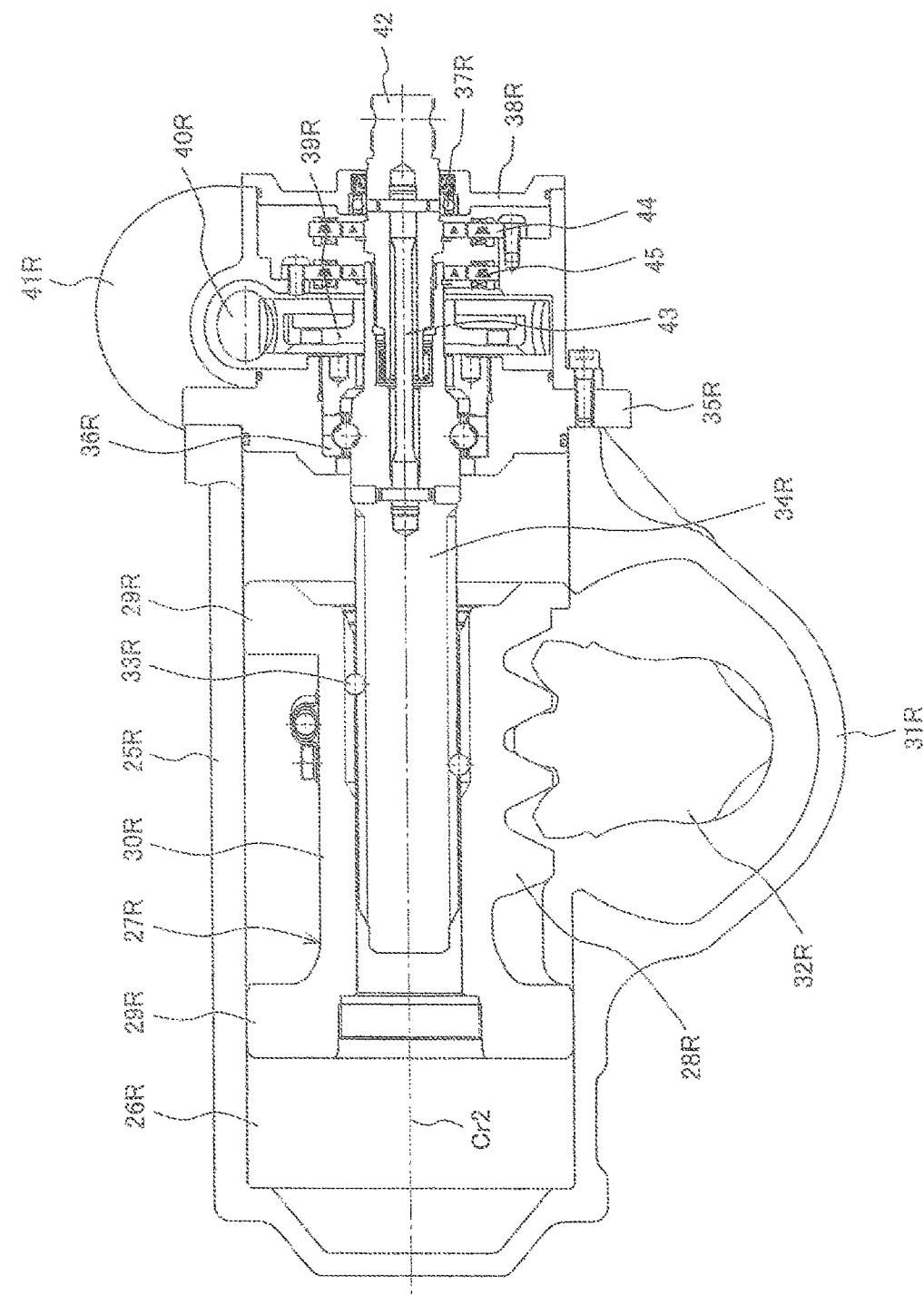
FIG. 3 is a sectional view showing a configuration of the electric steering mechanism on a side which is connected to the steering wheel.

Next, concrete configurations of the first electric steering mechanism 16L and the second electric steering mechanism 16R are explained with reference to FIG. 2 and FIG. 3. FIG. 2 shows the first electric steering mechanism 16. FIG. 3 shows the second electric steering mechanism 16R.

In FIG. 2 showing the first electric steering mechanism 16L, a first nut 27L is received within a first inside receiving space 26L of the first housing 25L which has an elongated hollow cylindrical bottomed shape, and which include an opened one end portion. The first nut 27L is arranged to be slidably moved in the axial direction of the first housing 25L. A first rack portion (=first transmitting mechanism) 28L is formed in a part of the first nut 27L, that is, a side circumferential portion of the first nut 27L.

The first housing 25L is made from the metal. The first nut 27L received within the first inside receiving space 26L includes first large diameter portions 29L located at both end portions. These first large diameter portions 29L are arranged to be slidably moved on the inner circumference surface of the first inside receiving space 26L. The first rack portion 28L is formed in a small diameter portion 30L between the first large diameter portions 29L.

Moreover, a first sector gear receiving portion 31L is integrally formed with a side surface of the first housing 25L. A first sector gear 32L is received and disposed within the first sector gear receiving portion 31L. This first sector gear 32L is engaged with the first rack portion 28L formed in the first nut 27L. In a state shown in FIG. 2, the first sector gear 32L is arranged to be rotated in a clockwise direction (positive direction) and in a counterclockwise direction (negative direction) by leftward and rightward sliding movements of the first nut 27L.

The first sector gear 32L is connected with the first pitman arm 15L shown in FIG. 1. The rotation movement of the first sector gear 32L is transmitted to the first pitman arm 15L so as to turn the first steered wheel 10L.

A helical screw groove is cut on an inside portion of the first nut 27L in the axial direction (the sliding movement direction) of the first nut 27L. A first output shaft 34L including a first ball screw 33L is screwed in this screw groove. A rotation axis Cr1 of the first output shaft 34L corresponds to a center axis of the sliding movement direction of the first nut 27L. When the first output shaft 34L is rotated around the rotation axis Cr1, the first nut 27L is slidably moved in leftward and rightward directions in the drawing. In this case, a first ball nut (type) steering is constituted by the first output shaft 34L, the first ball screw 33L, the first nut 27L, and the first rack portion 28L.

A first bearing member 35L made from the metal is liquid-tightly mounted to the opening end of the first housing 25L. A first ball bearing (A) 36L is provided at a center of the first bearing member 35L. The first output shaft 34L penetrates through the first ball bearing (A) 36L so that the first output shaft 34L is rotatably supported by the first ball bearing (A) 36L. A penetrating end portion of the first output shaft 34L is rotatably supported by a first ball bearing (B) 37L. The first ball bearing (B) 37L is fixed to the first cover 38L. The first cover 38L liquid-tightly surrounds and sealingly closes the speed reduction mechanism described later.

A first worm wheel 39L is fixed to an end portion of the first output shaft 34L positioned between the first bearing member 35L and the first cover 38L. This first worm wheel 39L is engaged with a first worm 40L. These constitute the speed reduction mechanism. The first worm 40L is fixed on a rotation shaft of the first electric motor 41L so as to be driven by the first electric motor 41L.

The first electric motor 41L is fixed on an outer surface of the first housing 25L so that the rotation axis of the rotation shaft of the first electric motor 41L is positioned perpendicular to the rotation axis Cr1 of the first output shaft 34L. With this, it is possible to decrease the size (frame) of the first electric steering mechanism 16L in the longitudinal direction (in the direction of the rotation axis Cr1 of the first output shaft 34L), and thereby to improve the adaptability (layout characteristics) when it is mounted to the vehicle.

Moreover, the speed reduction mechanism is constituted by the first worm wheel 39L and the first worm 40L. Accordingly, it is possible to decrease the size, and to suppress the size increase and the weight increase of the steering device. Furthermore, the rotational force of the first electric motor 41L is amplified while decreasing the speed of the rotational force of the first electric motor 41L. Accordingly, it is possible to use the small electric motor. Alternatively, when the size is not decreased, it is possible to obtain the operations and the effects to increase the steering assist force.

Moreover, the hydraulic system is not used. Accordingly, the hydraulic pressure pump, the hydraulic pressure pipes, and so on are not needed. Consequently, it is possible to simplify the system. Moreover, the electric control signal is sent to the first electric motor 41L to provide the steering assist force. Accordingly, it is possible to obtain the operations and the effects to increase the response. The high response is related to the further improvement of the steering control characteristics obtained by a control flow described later.

In the thus-constructed first electric steering mechanism 16L, when the drive control signal (corresponding to the steering assist force) from the first control device 22L is provided to the first electric motor 41L, the first motor 41L drives and rotates the first output shaft 34L through the first worm 40L, and the first worm wheel 39L. When the first output shaft 34L is rotated, the first nut 27L is slidably moved by the first ball screw 33L, so that the first rack portion 28L rotates the first sector gear 32L. With this, it is possible to provide the steering assist force to the first steered wheel 10L through the link system.

Next, a concrete configuration of the second electric steering mechanism 16R is explained. In FIG. 3 showing the second electric steering mechanism 16L, a second nut 27R is received within a second inside receiving space 26R of the second housing 25R which has an elongated hollow cylindrical bottomed shape, and which include an opened one end portion. The second nut 27R is arranged to be slidably moved in the axial direction of the second housing 25R. A second rack portion second transmitting mechanism) 28R is formed in a part of the second nut 27R, that is, a side circumferential portion of the second nut 27R.

The second housing 25R is made from the metal. The second nut 27R received within the second inside receiving space 26R includes second large diameter portions 29R located at both end portions. These second large diameter portions 29R are arranged to be slidably moved on the inner circumference surface of the second inside receiving space 26R. The second rack portion 28R is formed in a second small diameter portion 30R between the second large diameter portions 29R.

Moreover, a second sector gear receiving portion 31R is integrally formed with a side surface of the second housing 25R. A second sector gear 32R is received and disposed within the second sector gear receiving portion 31R. This second sector gear 32R is engaged with the second rack portion 28R formed in the second nut 27R. In a state shown in FIG. 3, the second sector gear 32R is arranged to be rotated in a clockwise direction (positive direction) and in a counterclockwise direction (negative direction) by leftward and rightward sliding movements of the second nut 27R.

The second sector gear 32R is connected with the second pitman arm 15R shown in FIG. 1. The rotation movement of the second sector gear 32R is transmitted to the second pitman arm 15R so as to turn the second steered wheel 10R.

A helical screw groove is cut on an inside portion of the second nut 27R in the axial direction (the sliding movement direction) of the second nut 27R. A second output shaft 34R including a second ball screw 33R is screwed in this screw groove. A rotation axis Cr2 of the second output shaft 34R corresponds to a center axis of the sliding movement direction of the second nut 27R. When the second output shaft 34R is rotated around the rotation axis Cr2, the second nut 27R is slidably moved in leftward and rightward directions in the drawing. In this case, a second ball nut (type) steering is constituted by the second output shaft 34R, the second ball screw 33R, the second nut 27R, and the second rack portion 28R.

A second bearing member 35R made from the metal is liquid-tightly mounted to the opening end of the second housing 25R. A second ball bearing (A) 36R is provided at a center of the second bearing member 35R. The second output shaft 34R penetrates through the second ball bearing (A) 36R so that the second output shaft 34R is rotatably supported by the second ball bearing (A) 36R. One end of a torsion bar 43 described later is fixed in an inside space near the end portion of the second output shaft 34R.

A second worm wheel 39R is fixed to an end portion of the second output shaft 34R which penetrates from the second bearing member 35R. This second worm wheel 39R is engaged with a second worm 40R. These constitute the speed reduction mechanism. The second worm wheel 39R is fixed on a rotation shaft of the second electric motor 41R so as to be driven by the second electric motor 41R.

The second electric motor 41R is fixed on an outer surface of the second housing 25R so that the rotation axis of the rotation shaft of the second electric motor 41R is positioned perpendicular to the rotation axis Cr2 of the second output shaft 34R. With this, it is possible to decrease the size (frame) of the second electric steering mechanism 16R in the longitudinal direction (in the direction of the rotation axis Cr2 of the second output shaft 34R), and thereby to improve the adaptability (layout characteristics) when it is mounted to the vehicle.

Similarly to the first electric steering mechanism 16L, the speed reduction mechanism is constituted by the second worm wheel 39R and the second worm 40R. Accordingly, it is possible to decrease the size, and to suppress the size increase and the weight increase of the steering device. Furthermore, the rotational force of the second electric motor 41R is amplified while decreasing the speed of the rotational force of the second electric motor 41R. Accordingly, it is possible to use the small electric motor. Alternatively, when the size is not decreased, it is possible to obtain the operations and the effects to increase the steering assist force.

Moreover, similarly to the first electric steering mechanism 16L, the hydraulic system is not used. Accordingly, the hydraulic pressure pump, the hydraulic pressure pipes, and so on are not needed. Consequently, it is possible to simplify the system. Moreover, the electric control signal is sent to the second electric motor 41R to provide the steering assist force. Therefore, it is possible to obtain the operations and the effects to increase the response. The high response is related to the further improvement of the steering control characteristics obtained by a control flow described later.

In this case, the second electric steering mechanism 16R is provided with an input shaft 42 connected to the steering shaft 17 fixed to the steering wheel 18. The other end of the torsion bar 43 is fixed to the input shaft 42, so that the input shaft 42 is connected to the second output shaft 34R. Accordingly, the torsion bar 43 is twisted between the second output shaft 34R and the input shaft 42. It is possible to sense the torque by measuring the twist amount.

In this way, the second output shaft 34R is connected through the input shaft 42 to the steering wheel 18. With this, the steering wheel 18 is connected to the side of the second electric motor 41R which is arranged to output the large torque in the direction identical to the turning direction. Accordingly, the driver can readily feel the response of the steering assist. Consequently, it is possible to improve the steering feeling.

For sensing the twist of the torsion bar 43, a first angle sensor 44 is mounted to the input shaft 42, and a second angle sensor 45 is mounted to the second output shaft 34R. The steering torque is sensed based on a relative rotation angle sensed by the first angle sensor 44 of the input shaft 42, and the second angle sensor 45 of the second output shaft. Besides, the first angle sensor 44 and the second angle sensor 45 can sense the input from the input shaft 42, and the reverse input from the second output shaft 34R. This is explained based on a control flowchart described later.

Besides, the input shaft 42 is rotatably supported by the second ball bearing (B) 37R. The second ball bearing (B) 37R is fixed to the second cover 38R. The second cover 38R liquid-tightly surrounds and sealingly closes the speed reduction mechanism including the worm wheel 39R and the worm 40, and the first angle sensor 44 and the second angle sensor 45 which constitute the torque sensor.

In this case, by sensing advancing directions of the phases of the first angle sensor 44 and the second angle sensor 45, it is possible to accurately sense whether it is the input from the steering wheel, or the reverse input from the road surface.

Moreover, as shown in FIG. 2 and FIG. 3, the first electric steering mechanism 16L and the second electric steering mechanism 16R have the substantially identical shapes. In particular, the respective housings 25L and 25R, the respective nuts 27L and 27R, and the respective sector gear 32L and 32R have the same shapes. Accordingly, it is possible to commonly use the components, and thereby to decrease the manufacturing cost.

Besides, the first nut 27L and the second nut 27R, and the first sector gear 32L and the second sector gear 32R have different portions as long as the specifications of the teeth are identical to each other. Moreover, the housings 25L and 25R have different shapes in some cases. However, at least, the respective nuts 27L and 27R, and the respective sector gears 32L and 32R can be commonly used.

In the thus-constructed second electric steering mechanism 16R, when the drive control signal (corresponding to the steering assist force) from the second control device 22R is provided to the second electric motor 41R, the second motor 41R drives and rotates the second output shaft 34R through the second worm 40R, and the second worm wheel 39R. When the second output shaft 34R is rotated, the second nut 27R is slidably moved by the second ball screw 33R, so that the second rack portion 28R rotates the second sector gear 30. With this, it is possible to provide the steering assist force to the second steered wheel 10R through the link system.

Figure 4:
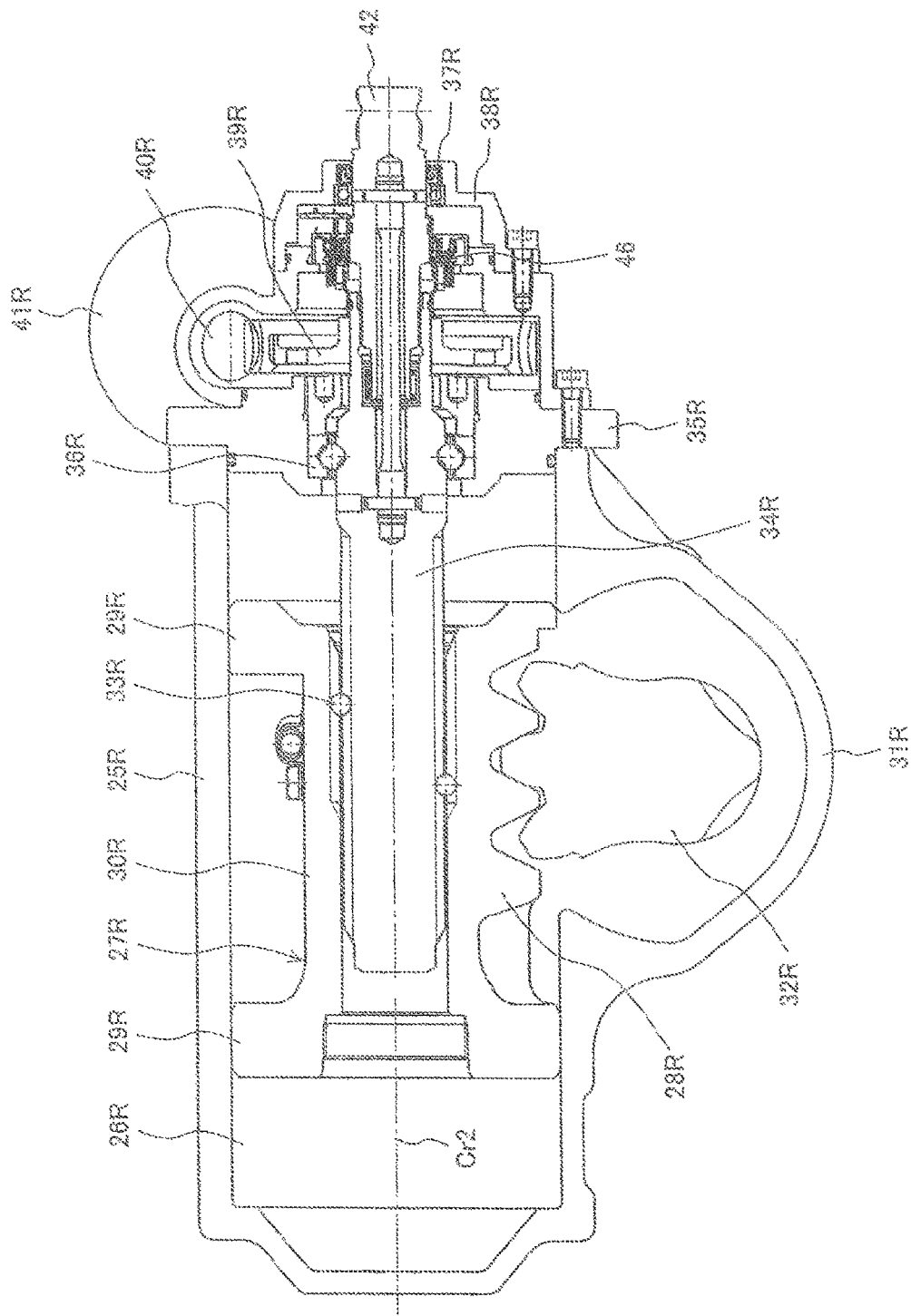
FIG. 4 is a sectional view showing another configuration of an electric steering mechanism on a side which is connected to the steering wheel.

In the second electric steering mechanism 16R shown in FIG. 3, the steering torque is sensed by the first angle sensor 44 and the second angle sensor 45. However, it is possible to sense the steering torque by using a Hall element. FIG. 4 shows a case in which the steering torque is sensed by using the Hall element. A configuration of FIG. 4 is substantially identical to the configuration of FIG. 3. Accordingly, the explanation about the same symbols are omitted.

In FIG. 4, a magnetic type torque sensor 46 using permanent magnets and the Hall element is provided between the second output shaft 34R and the input shaft 42. With this, it is possible to sense the steering torque. Moreover, by using two magnetic type torque sensor, it is possible to sense whether it is the input from the input shaft 42, or the reverse input from the second output shaft 34R, similarly to the second electric steering mechanism 16R shown in FIG. 3.

Furthermore, the second electric steering mechanism 16R is applicable to a steering device of a column assist type. That is, the second output shaft 34R of the second electric steering mechanism 16R is interlocked so as to assist the steering column. With this, it is possible to provide the steering force to the steering column, similarly to this embodiment. By employing this configuration, it is possible to apply to a vehicle whose a foot space of a driver is small, like a cab-over track, and to improve the layout characteristics.

Next, the control of the first electric motor 41L of the first electric steering mechanism 16L, and the second electric motor 41R of the second electric steering mechanism 16R is explained. Basically, the first electric motor 41L is controlled by the first control device 22L. The second electric motor 41R is controlled by the second control device 22R.

In FIG. 5, the first control device 22L includes a vehicle speed judging section 50 configured to receive vehicle speed information for judging the vehicle speed of the vehicle; a first motor malfunction judging section 51L configured to receive motor state signal of the first electric motor 41L, and to judge a failure and an abnormality of the first electric motor 41L; a first electric motor assist calculating section 52L configured to receive the vehicle speed information from the vehicle speed judging section 50, second electric motor malfunction information from a second electric motor malfunction judging section 51R of the second control device 22R described later, and the torque information from a torque judging section 55 of the second control device 22R described later, and to determine a driving control amount of the first electric motor 41L; and a first electric motor driving section 53L in which the driving control amount of the first electric motor 41L is set, and which is configured to produce the driving control signal of the first electric motor 41L.

In this case, the vehicle speed judging section 50, the first motor malfunction judging section 51L, and the first electric motor assist calculating section 52L are functional blocks performed by programs of the first microcomputer 24L. The first electric motor driving section 53L is an output circuit. Details of these functional blocks are explained in a control flowchart shown in FIG. 6.

The second control device 22R includes a second motor malfunction judging section 51R configured to receive motor information signal of the second electric motor 41R, and to judge a failure and an abnormality of the second electric motor 41R; a disturbance judging section 54 configured to receive the sensor information of the first angle sensor 44 and the second angle sensor 45, and to judge the disturbance from the steered wheels 10L and 10R; a torque judging section 55 configured to judge the torque based on the disturbance information from the disturbance judging section 54, or the sensor information of the first angle sensor 44 and the second angle sensor 45; a second electric motor assist calculating section 52R configured to receive the first electric motor malfunction information from the first motor malfunction judging section 51L of the first control device 22L, and the torque information from the torque judging section 55, and to determine the driving control amount of the second electric motor 41R, and a second electric motor driving section 53R in which the driving control amount of the second electric motor 41R is set, and which is configured to produce the driving control signal of the second electric motor 41R.

Similarly to the first control device 22L, the second motor malfunction judging section 51R, the disturbance judging section 54, the torque judging section 55, and the second electric motor assist calculating section 52R are functional blocks performed by programs of the second microcomputer 24R. The second electric motor driving section 53R is an output circuit. Details of these functional blocks are also explained in the control flowchart shown in FIG. 6.

Moreover, the first control device 22L and the second control device 22R are connected by communication lines. When the malfunction of the failure and the abnormality is generated in one of the microcomputer 24L of the first control device 22L, and the microcomputer 24R of the second control device 22R, the steering control is performed by the other of the microcomputers.

With this, a redundant steering system can be constituted by the first microcomputer 24L and the second microcomputer 24R. Even when one of the microcomputers is in the functional malfunction state, the steering control can be continued and performed in the other of the microcomputers. Moreover, the driving control amount calculated in the microcomputer in the normal state can be sent to the electric motor driving section in which the malfunction is generated, as described by a broken line arrow. With this, it is possible to operate the both electric steering mechanisms.

Moreover, even when the abnormality, the failure and so on is generated in one of the first electric motor 41L and the second electric motor 41R, it is possible to keep the steering function by the electric motor in the normal state. With this, the redundant steering system can be constituted by the first electric motor 41L and the second electric motor 41R. Even at the malfunction of one of the electric motors, the steering control can be continued and performed in the other of the electric motors. In this case, in a case where the speed reduction mechanism on the side on which the malfunction is generated has a function of a reverse efficiency, a mechanism arranged to release the function of the reverse efficiency is provided between the speed reduction mechanism and the rack portion.

Next, the control of the first control device 22L and the second control device 22R is explained with reference to the control flowchart shown in FIG. 6. Besides, this control flow is started at every predetermined time. For example, it can be performed by the comparison match interruption of the inside timer of the microcomputer.

<<step S10>> At step S10, it is judged whether or not the steering torque is varied by the rotation operation of the steering wheel 1, based on the torque sensor. This can be judged by sensing the twist of the torsion bar 41 by the first angle sensor 44 and the second angle sensor 45 which are provided to the second electric steering mechanism 16R.

In a case where the rotation operation of the steering wheel 18 is not performed, and where it is not sensed that the torque is varied, the process proceeds to the return to wait for next start timing. On the other hand, in a case where the rotation operation of the steering wheel 18 is performed, and where it is sensed that the torque is varied, the process proceeds to step S11.

<<Step S11>> At step S11, it is judged whether or not the disturbance is sensed by the information from the first angle sensor 44 and the second angle sensor 45. In this case, the disturbance is the reverse input from the steered wheels 10L and 10R. The reverse input may often adversely affect the steering characteristics. For example, when the reverse input is generated due to the shape variation of the road surface such as the rut (trace), the steering stability of the steering wheel 18 may be deteriorated. With this, the turning positon (=the turning angle) of the steered wheels 10L and 10R are varied, so that the stable steering position is difficult to be ensured.

The disturbance is the reverse input. Accordingly, it is possible to judge the disturbance by sensing that the phase signal of the second angle sensor 45 provided to the second output shaft 34R precedes the phase signal of the first angle sensor 44 provided to the input shaft 42. On the other hand, it is possible to judge the normal rotation operation by the steering wheel 18 by sensing that the phase signal of the first angle sensor 44 provided to the input shaft 42 precedes the phase signal of the second angle sensor 45 provided to the second output shaft 34R.

When it is judged that the disturbance is sensed, the process proceeds to step S12. When it is judged that the disturbance is not sensed, the process proceeds to step S13.

<<Step S12>> At step S12, the motor torque command value is calculated. This motor torque command value is the driving control amount to keep the current turning position of the first electric motor 41L of the first steering mechanism 16L so as not to vary the turning position even when the mechanical impact and so on by the disturbance is acted to the steered wheels 10L and 10R. That is, even when the impact is applied to the steered wheels 10L and 10R from the rut, the gravel road, and so on, the first electric steering mechanism 16L is configured to keep the current turning position so as not to vary the turning position of the steered wheels 10L and 10R. Subsequently to the determination of the motor torque command value, the process proceeds to step S14.

<<Step S13>> At step S13, the motor torque command value calculated at step S12 is set to the first electric motor driving section 53L. Then, the driving current is supplied to the first electric motor 41L so as to generate the predetermined torque.

In this way, the respective control steps of steps S11, S12, and S13 are performed. With this, it is possible to keep the turning positon of the steered wheels 10L and 10R with respect to the disturbance from the road surface, and thereby to perform the stable steering control.

Moreover, the advancing degrees of the phases of the angles between the upstream side (steering wheel side) and the downstream side (the steered wheel side) of the torsion bar 43 are compared. With this, it is possible to accurately judge whether it is the input from the steering wheel or the reverse input (the disturbance) from the road surface.

Subsequently to the driving control of the first electric motor 41L at step S13, the process proceeds to the return to wait for the next start timing.

<<Step S14>> When the disturbance is not sensed at step S11, the normal rotation operation of the steering wheel 18 is judged. At step S14, it is judged whether or not the state signals of the first electric motor steering mechanism 16L and the second electric motor steering mechanism 16R are sensed. For example, the actuation signals of the first electric motor 41L and the second electric motor 41R are monitored. With this, it is possible to judge the malfunction state of the failure and the abnormality of the first electric steering mechanism 16L and the second electric steering mechanism 16R, by the missing (omission) of these actuation signals, or the appearance of the abnormality signal.

Moreover, the first microcomputers 24L and 24R can be monitored each other so as to judge the mutual normality. Alternatively, the normality of the first microcomputers 24L and 24R can be judged by another monitoring computer. This judgment can be considered as the malfunction judgment of step S14.

Then, when it is judged that the malfunction is generated in the second electric steering mechanism 16R, the process proceeds to step S15. When it is judged that the malfunction is generated in the first electric steering mechanism 16L, the process proceeds to step S17. On the other hand, when it is judged that the malfunction is not generated in the first electric steering mechanism 16L and the second electric steering mechanism 16R, that is, it is judged that the normal state is judged, the process proceeds to step S19.

<<Step S15>> Subsequently to the judgment of the generation of the malfunction in the second electric steering mechanism 16R, at step S15, the motor torque command value which is the driving control amount of the first electric motor 41L of the first electric steering mechanism 16L is calculated from the sensed torque corresponding to the operation amount of the steering wheel 18, That is, the steering assist force corresponding to the operation amount of the steering wheel 18 is calculated. The steering assist is performed by the first electric motor 41L.

In this case, the steering assist force is decreased since the second electric motor 41R is malfunctioned. Accordingly, it is optional to set the motor torque value of the first electric motor 41L to the large value. Besides, at this time, it is optional to prohibit the actuation of the second electric motor driving section 53R so as not to supply the driving control signal to the second electric motor 41R. Subsequently to the determination of the motor torque command value based on the sensed torque, the process proceeds to step S16.

<<Step S16>> At step S16, the motor torque command value calculated at step S15 is set to the first electric motor driving section 53L. Then, the driving current is supplied to the first electric motor 41L so as to generate the predetermined torque.

In this way, at step S14, S15, and S16, the first electric motor 41L and the second electric motor 41R form the redundant system. At the malfunction of the second electric motor 41R, the first electric motor 41L can continue to provide the steering assist force. Moreover, the first microcomputer 24L and the second microcomputer 24R form the redundant system. With this, at the malfunction of the second microcomputer, the first microcomputer 24L can continue to provide the steering assist force.

At step S16, the driving control of the first electric motor 41L is performed. The process proceeds to the return to wait for the next start timing.

<<Step S17>> When it is judged that the malfunction is generated in the first electric steering mechanism 16L at step S14, the process proceeds to step S17. Subsequently to the judgment of the generation of the malfunction in the first electric steering mechanism 16L, at step S17, the motor torque command value which is the driving control amount of the second electric motor 41R of the second electric steering mechanism 16R is calculated from the sensed torque corresponding to the operation amount of the steering wheel 18. That is, the steering assist force corresponding to the operation amount of the steering wheel 18 is calculated. The steering assist is performed by the second electric motor 41R.

In this case, the steering assist force is also decreased since the first electric motor 41L is malfunctioned. Accordingly, it is optional to set the motor torque value of the second electric motor 41R to the large value. Besides, at this time, it is optional to prohibit the actuation of the first electric motor driving section 53L so as not to supply the driving control signal to the first electric motor 41L. Subsequently to the determination of the motor torque command value based on the sensed torque, the process proceeds to step S18.

<<Step S18>> At step S18, the motor torque command value calculated at step S17 is set to the second electric motor driving section 53R. Then, the driving current is supplied to the second electric motor 41R so as to generate the predetermined torque.

In this way, at step S14, S17, S18, the first electric motor 41L and the second electric motor 41R form the redundant system. At the malfunction of the first electric motor 41L, the second electric motor 41R can continue to provide the steering assist force. Moreover, the first microcomputer 24L and the second microcomputer 24R form the redundant system. With this, at the malfunction of the first microcomputer 24L, the second microcomputer 24R can continue to provide the steering assist force.

At step S18, the driving control of the second electric motor 41R is performed. The process proceeds to the return to wait for the next start timing.

<<Step S19>> When it is judged that the malfunction is not generated in the first electric steering mechanism 16L and the second steering mechanism 16R (=normal state) at step S14, the process proceeds to step S19. At step S19, it is judged whether or not the sensed steering torque is greater than a predetermined steering torque T1. This judgement corresponds to a case where the steering wheel 18 is largely operated and rotated to turn the vehicle. At step S19, it is judged that the sensed steering torque is greater than the predetermined steering torque T1, the process proceeds to step S20. When it is judged that the sensed steering torque is smaller than the predetermined steering torque T1, the process proceeds to step S23.

<<Step S20>> At step S20, the motor torque command values which are driving control amounts of the first electric motor 41L and the second electric motor 41R corresponding to the sensed steering torque are calculated to direct the direction identical to the turning direction which is the rotation direction of the steering wheel 18. That is, the steering assist force corresponding to the operation amount of the steering wheel 18 is calculated. The steering assist is performed by the first electric motor 41L and the second electric motor 41R. In this case, the motor torque values of the first electric motor 41l and the second electric motor 41R are the same value. Subsequently to the respective calculations of the electric motor 41L and 41R, the process proceeds to step S21.

<<Step S21>> At step S21, the motor torque command value calculated at step S20 is set to the second electric motor driving section 53R. Then, the driving current is supplied to the second electric motor 41R to generate the predetermined torque. In this case, the second electric steering mechanism 16R is controlled to provide the steering assist force in advance of the first electric steering mechanism 16L. At step S21, the second electric steering mechanism 16R is controlled and driven. Then, the process proceeds to step S22.

<<Step S22>> At step S22, the motor torque command value calculated at step S20 is set to the first electric motor driving section 53L. Then, the driving current is supplied to the first electric motor 41L to generate the predetermined torque. As described above, the first electric steering mechanism 16L is controlled to provide the steering assist force after the second electric steering mechanism 16R.

By performing the control steps of step S21 and S22, it is possible to perform the steering assist of the steered wheels 10L and 10R so as to suppress the disturbance from the road surface while holding the turning positons of the steered wheels 10L and 10R. Moreover, it is possible to perform the stable steering control so that the steered wheels 10L and 10R are less subject to the disturbance from the road surface. In this case, it is preferable that a time interval of the steering assist forces added by the first electric steering mechanism 16L and the second electric steering mechanism 16R is set to be a time period by which the driver does not feel unnatural feeling with respect to the additions of the respective steering assist forces.

Besides, the disturbance is a high frequency vibration inputted from the road surface to the steered wheels when the vehicle travels on the rough road surface such as the rut and the gravel road. Accordingly, in the so detection of the disturbance, it is possible to judge the disturbance is generated when a specific frequency signal (signal of a predetermined frequency or more) is sensed in the output signal of the torque sensor.

Alternatively, it is possible to judge based on the output signal of the yaw rate sensor. Moreover, it is possible to judge based on the vibration of the image of the road surface which is taken by the camera. Moreover, it is possible to judge based on the phases of the vibrations of the angle signal of the torque sensor of the upstream side (the handle side) of the torsion bar, and the angle signal of the torque sensor of the downstream side (the steered wheel side) of the torsion bar. In this case, it is possible to judge that the disturbance is generated when the angle signal of the downstream side precedes the angle signal of the upstream side.

In this way, the second electric steering mechanism 16R connected to the steering wheel 18 is antecedently controlled and driven by performing the control steps of the steps S20, S21, and S22. With this, the driver can readily feel that the steering device responds to the steering operation. Moreover, the first electric motor 41L responds behind the driving control of the second electric motor 41R. With this, it is possible to improve the stability of the steering device.

Furthermore, the vehicle is largely turned, the large steering assist force is needed. Accordingly, by controlling and driving both the first electric motor 41L and the second electric motor 41R, it is possible to improve the steering response, and to suppress the deficiency of the steering force.

At step S22, the driving control of the first electric motor 41L is performed. The process proceeds to the return to wait for the next start timing.

<<Step S23>> At step S19, when it is judged that the operation amount of the steering wheel 18 is small, and that the sensed steering torque is smaller than the predetermined steering torque T1, the process proceeds to step S23. At this step S23, the vehicle speed of the vehicle is judged. When the vehicle speed is lower than a predetermined vehicle speed V1 (low speed travel), the process proceeds to step S24. When the vehicle speed is higher than the predetermined vehicle speed V1 (high speed travel), the process proceeds to step S26.

<<Step S24>> At step S24, problems generated at the high speed of the vehicle described later are not considered since the speed of the vehicle is low. Moreover, the steering assist force is not needed to be increased so much from step S19. Accordingly, the steering assist force is provided only by the second electric steering mechanism 16R interlocked with the steering wheel 18 side. Consequently, the motor torque command value which is the driving control amount of the second electric motor 41R of the second electric steering mechanism 16R is calculated from the sensed torque corresponding to the operation amount of the steering wheel 18. Subsequently to the calculation of the motor torque command value of the second electric motor 41R, the process proceeds to step S25.

<<Step S25>> At step S25, the motor torque command value calculated at step S24 is set to the second electric motor driving section 53R. Then, the driving current is supplied to the second electric motor 41R to generate the predetermined torque.

In this way, when the operation amount of the steering wheel 18 is small, and when the speed of the vehicle is low, the steering assist force is provided only by the second electric steering mechanism 16R. With this, it is possible to decrease the consumption amount of the electric energy, and thereby to decrease the fuel consumption amount.

At step S25, the driving control of the second electric motor 41R is performed. Then, the process proceeds to the return to wait for the next start timing.

<<Step S26>> Subsequently to the judgment that the vehicle speed is higher than the predetermined vehicle speed V1 at step S23, the motor torque command value of the second electric motor 41R is calculated at step S26. This motor torque command value is needed to be a value to strongly (firmly) keep the turning position by the steering assist force since the vehicle speed is high (the high speed travel). This is because the vehicle may be meandered when the steered position is varied in the high vehicle speed. Accordingly, firstly, at step S26, the steering assist force of the second electric motor 41R necessary for the steering assist is calculated. Subsequently to the calculation of the motor torque command value of the second electric motor 41R, the process proceeds to step S27.

<<Step S27>> At step S27, the motor torque command value is calculated so that the first electric motor 41L can produce the steering assist force so that the vehicle is not meandered by keeping the turning positons of the steered wheels 10L and 10R. In this case, the motor torque command value of the first electric motor 41L is set to be smaller than the motor torque command value of the second electric motor 41R. Subsequently to the calculation of the motor torque command value of the first electric motor 41L, the process proceeds to step S28.

<<Step S28>> At step S28, the motor torque command value calculated at step S26 is set to the second electric motor driving section 53R. Then, the driving current is supplied to the second electric motor 41R to generate the predetermined torque. Subsequently to the setting of the motor torque command value of the second electric motor 41R to the second electric motor driving section 53R, the process proceeds to step S29.

<<Step S29>> At step S29, the motor torque command value calculated at step S27 is set to the first electric motor driving section 53L. Then, the driving current is supplied to the first electric motor 41L to generate the predetermined torque. In this case, the motor torque of the first electric motor 41L is smaller than the motor torque of the second electric motor 41R, as described above. Subsequently to the driving control of the first electric motor 41L at step S29, the process proceeds to the return to wait for the next start timing.

By the steps S26, S27, S28, and S29, it is possible to improve the stability of the steering at the high speed travel. Moreover, it is possible to suppress the divergence of the motions of the first electric motor 41L and the second electric motor 41R since the steering assist forces of the first electric motor 41L and the second electric motor 41R are different from each other, and to produce the firm feeling of the steering operation.

As described above, in the present invention, the first electric steering mechanism includes the first motor actuator. The second electric steering mechanism includes the second motor actuator. These are independently controlled by the control device. With this, the different controls are performed, respectively, to the first electric steering mechanism and the second electric steering mechanism. With this, it is possible to provide arbitrary steering control characteristics, and to improve the steering characteristics. Moreover, the motor actuators provide the steering assist force. Accordingly, the response is rapid. Consequently, it is possible to further improve the above-described steering control characteristics.

Besides, the present invention is not limited to the above-described embodiment. The present invention includes various variations. For example, the above-described embodiment is explained in detail for easily understanding the present invention. The present invention is not limited to the structure including the entire explained configurations. Moreover, a part of the configuration of one of the embodiments may be replaced by a configuration of the other of the embodiments. Furthermore, a configuration of the other of the embodiments may be added to a configuration of one of the embodiments. Moreover, a configuration of one of the embodiments may be added to a configuration of the other of the embodiments. Furthermore, a configuration of the other of the embodiments may be added to a configuration of one of the embodiments. Another configuration may be added, deleted, and replaced with respect to a part of the configuration of the embodiments.

For example, below-described aspects are conceivable as the steering device according to the above-described embodiments.

That is, a steering device according to one aspect includes a first steering mechanism including a first ball nut steering, and a first motor actuator, the first ball nut steering including a first output shaft, a first ball screw, and a first transmitting mechanism, the first output shaft being arranged to be rotated about a rotation axis of the first output shaft, the first ball screw being arranged to drive the first nut so that the first nut is moved in a direction of the rotation axis of the first output shaft in accordance with the rotation of the first output shaft, and the first transmitting mechanism being arranged to turn a first steered wheel in accordance with a movement of the first nut, the first motor actuator being a first electric motor arranged to provide a rotation force to the first output shaft, a second steering mechanism including a second ball nut steering, and a second motor actuator, the second ball nut steering including a second output shaft, a second ball screw, and a second transmitting mechanism, the second output shaft being arranged to be rotated about a rotation axis of the second output shaft, the second ball screw being arranged to drive the second nut so that the first nut is moved in a direction of the rotation axis of the second output shaft in accordance with the rotation of the second output shaft, and the second transmitting mechanism being arranged to turn a second steered wheel in accordance with a movement of the second nut, the second motor actuator being a second electric motor arranged to provide a rotation force to the second output shaft, a connection member arranged to connect the first transmitting mechanism and the second transmitting mechanism so as to interlock a movement of the first transmitting mechanism and a movement of the second transmitting mechanism.

In a preferable aspect of the steering device, the steering device includes a control device configured to control and drive the first motor actuator and the second motor actuator; and when the control device rotates the second motor actuator in a direction identical to the turning direction of the first steered wheel and the second steered wheel, the control device is configured to control and drive the first motor actuator and the second motor actuator so that a rotation torque of the second motor actuator is greater than a rotation torque of the first motor actuator.

In another preferable aspect, in one of the aspects of the steering devices, when the control device rotates the second motor actuator in the direction identical to the turning direction of the first steered wheel and the second steered wheel, the control device is configured to control and drive the first motor actuator so that the first steered wheel holds a turning angle.

In still another preferable aspect, in one of the aspects of the steering devices, when the control device rotates the second motor actuator in a direction identical to the turning direction of the second steered wheel at a predetermined vehicle speed or more, the control device is configured to control and drive the first motor actuator so that the first steered wheel holds the turning angle.

In still another preferable aspect, in one of the aspects of the steering devices, when the control device rotates the second motor actuator in a direction identical to the turning direction of the second steered wheel, the control device is configured to control and drive the first motor actuator so as to suppress a disturbance from a road surface.

In still another preferable aspect, in one of the aspects of the steering devices, the second output shaft is connected to a steering wheel.

In still another preferable aspect, in one of the aspects of the steering devices, the second steering mechanism includes an input shaft, a torsion bar, a first angle sensor, and a second angle sensor; the input shaft is connected to the steering wheel; the torsion bar is provided between the input shaft and the second output shaft; the first angle sensor is arranged to sense an angle of the input shaft; the second angle sensor is arranged to sense an angle of the second output shaft; and the control device is configured to judge the disturbance from the road surface when a phase of an output signal of the second angle sensor precedes a phase of an output signal of the first angle sensor, and to control and drive the first motor actuator so as to suppress the disturbance from the road surface when the control device rotates the second motor actuator in the direction identical to the turning direction of the second steered wheel.

In still another preferable aspect, in one of the aspects of the steering devices, the steering device includes a control device configured to control and drive the first motor actuator and the second motor actuator; the second output shaft is connected to a steering wheel; and the control device is configured to control and drive the second motor actuator in advance of the first motor actuator.

In still another preferable aspect, in one of the aspects of the steering devices, the first ball nut steering and the second ball nut steering have not a hydraulic circuit.

In still another preferable aspect, in one of the aspects of the steering devices, the first steering mechanism includes a first speed reduction mechanism provided between the first output shaft and the first motor actuator; and the second steering mechanism includes a second speed reduction mechanism provided between the second output shaft and the second motor actuator.

In still another preferable aspect, in one of the aspects of the steering devices, each of the first speed reduction mechanism and the second speed reduction mechanism includes a worm gear, and a worm wheel.

In still another preferable aspect, in one of the aspects of the steering devices, the first ball nut steering includes a first sector gear engaged with a first rack formed in the first nut; the second ball nut steering includes a second sector gear engaged with a second rack formed in the second nut; the first nut and the second nut has a same shape; and the first sector gear and the second sector gear has a same shape.

In still another preferable aspect, in one of the aspects of the steering devices, the steering device includes a control device configured to control and drive the first motor actuator and the second motor actuator, an input shaft, a torsion bar, and a torque sensor which are provided to the second steering mechanism; the input shaft is connected to a steering wheel; the torsion bar is provided between the input shaft and the second output shaft; the torque sensor is arranged to sense a steering torque of the second steering mechanism based on a relative rotation angle between the input shaft and the second output shaft; and the control device is configured to control and drive the first motor actuator and the second motor actuator in accordance with the steering torque.

In still another preferable aspect, in one of the aspects of the steering devices, when the steering torque is equal to or greater than a predetermined value, the control device is configured to control and drive the first motor actuator and the second motor actuator in a direction identical to the rotation direction of the steering wheel.

In still another preferable aspect, in one of the aspects of the steering devices, the second output shaft is connected to a steering column; the second motor actuator is provided to the steering column; and the second motor actuator is arranged to provide a steering force to the steering column.

In still another preferable aspect, in one of the aspects of the steering devices, the steering device includes a first control device configured to control and drive the first motor actuator, and a second control device configured to control and drive the second motor actuator; the first control device includes a first microcomputer configured to calculate a command signal outputted to the first motor actuator; and the second control device includes a second microcomputer configured to calculate a command signal outputted to the second motor actuator.

In still another preferable aspect, in one of the aspects of the steering devices, when one of the first motor actuator and the second motor actuator is malfunctioned, the other of the first motor actuator and the second motor actuator is continued to be controlled and driven.

In still another preferable aspect, in one of the aspects of the steering devices, when one of the first microcomputer and the second microcomputer is malfunctioned, the other of the first microcomputer and the second microcomputer is continued to be controlled and driven.

The invention claimed is:

1. A steering device comprising:
    a first steering mechanism including a first ball nut steering, and a first motor actuator,
        the first ball nut steering including a first output shaft, a first ball screw, and a first transmitting mechanism,
            the first output shaft being arranged to be rotated about a rotation axis of the first output shaft,
            the first ball screw being arranged to drive the first nut so that the first nut is moved in a direction of the rotation axis of the first output shaft in accordance with the rotation of the first output shaft, and
            the first transmitting mechanism being arranged to turn a first steered wheel in accordance with movement of the first nut,
        the first motor actuator being a first electric motor arranged to provide a rotation force to the first output shaft,
    a second steering mechanism including a second ball nut steering, and a second motor actuator,
        the second ball nut steering including a second output shaft, a second ball screw, and a second transmitting mechanism,
            the second output shaft being arranged to be rotated about a rotation axis of the second output shaft,
            the second ball screw being arranged to drive the second nut so that the first nut is moved in a direction of the rotation axis of the second output shaft in accordance with the rotation of the second output shaft, and
            the second transmitting mechanism being arranged to turn a second steered wheel in accordance with movement of the second nut,
        the second motor actuator being a second electric motor arranged to provide a rotation force to the second output shaft, and
    a connection member arranged to connect the first transmitting mechanism and the second transmitting mechanism so as to interlock movement of the first transmitting mechanism and movement of the second transmitting mechanism,
    wherein the steering device includes a control device configured to control and drive the first motor actuator and the second motor actuator; and when the control device rotates the second motor actuator in a direction identical to a turning direction of the first steered wheel and the second steered wheel, the control device is configured to control and drive the first motor actuator and the second motor actuator so that a rotation torque of the second motor actuator is greater than a rotation torque of the first motor actuator,
wherein the control device is configured such that when the control device rotates the second motor actuator in the direction identical to the turning direction of the first steered wheel and the second steered wheel, the control device controls and drives the first motor actuator so that the first steered wheel holds a turning angle, and
wherein the control device is configured such that when the control device rotates the second motor actuator in a direction identical to the turning direction of the second steered wheel, the control device controls and drives the first motor actuator so as to suppress disturbance from a road surface.

2. The steering device as claimed in claim 1, wherein the second output shaft is connected to a steering wheel.

3. The steering device as claimed in claim 2, wherein the second steering mechanism includes an input shaft, a torsion bar, a first angle sensor, and a second angle sensor;
the input shaft is connected to the steering wheel;
the torsion bar is provided between the input shaft and the second output shaft;
the first angle sensor is arranged to sense an angle of the input shaft;
the second angle sensor is arranged to sense an angle of the second output shaft; and
the control device is configured to judge the disturbance from the road surface when a phase of an output signal of the second angle sensor precedes a phase of an output signal of the first angle sensor, and to control and drive the first motor actuator so as to suppress the disturbance from the road surface when the control device rotates the second motor actuator in the direction identical to the turning direction of the second steered wheel.

4. The steering device as claimed in claim 1, wherein the second output shaft is connected to a steering wheel, and the control device is configured to control and drive the second motor actuator in advance of the first motor actuator.

5. The steering device as claimed in claim 1, wherein the first ball nut steering and the second ball nut steering do not have hydraulic circuits.

6. The steering device as claimed in claim 1, wherein the first steering mechanism includes a first speed reducer provided between the first output shaft and the first motor actuator; and the second steering mechanism includes a second speed reducer provided between the second output shaft and the second motor actuator.

7. The steering device as claimed in claim 6, wherein each of the first speed reducer and the second speed reducer includes a worm gear, and a worm wheel.

8. The steering device as claimed in claim 1, wherein the first ball nut steering includes a first sector gear engaged with a first rack formed in the first nut;
the second ball nut steering includes a second sector gear engaged with a second rack formed in the second nut;
the first nut and the second nut have a same shape; and the first sector gear and the second sector gear have a same shape.

9. A steering device comprising:
a first steering mechanism including a first ball nut steering, and a first motor actuator,
the first ball nut steering including a first output shaft, a first ball screw, and a first transmitting mechanism,
the first output shaft being arranged to be rotated about a rotation axis of the first output shaft,
the first ball screw being arranged to drive the first nut so that the first nut is moved in a direction of the rotation axis of the first output shaft in accordance with the rotation of the first output shaft, and
the first transmitting mechanism being arranged to turn a first steered wheel in accordance with movement of the first nut,
the first motor actuator being a first electric motor arranged to provide a rotation force to the first output shaft,
a second steering mechanism including a second ball nut steering, and a second motor actuator,
the second ball nut steering including a second output shaft, a second ball screw, and a second transmitting mechanism,
the second output shaft being arranged to be rotated about a rotation axis of the second output shaft,
the second ball screw being arranged to drive the second nut so that the first nut is moved in a direction of the rotation axis of the second output shaft in accordance with the rotation of the second output shaft, and
the second transmitting mechanism being arranged to turn a second steered wheel in accordance with movement of the second nut,
the second motor actuator being a second electric motor arranged to provide a rotation force to the second output shaft, and
a connection member arranged to connect the first transmitting mechanism and the second transmitting mechanism so as to interlock movement of the first transmitting mechanism and movement of the second transmitting mechanism,
wherein the steering device includes a control device configured to control and drive the first motor actuator and the second motor actuator, an input shaft, a torsion bar, and a torque sensor which are provided to the second steering mechanism;
the input shaft is connected to a steering wheel;
the torsion bar is provided between the input shaft and the second output shaft;
the torque sensor is arranged to sense a steering torque of the second steering mechanism based on a relative rotation angle between the input shaft and the second output shaft; and
the control device is configured to control and drive the first motor actuator and the second motor actuator in accordance with the steering torque.

10. The steering device as claimed in claim 9, wherein the control device is configured such that when the steering torque is equal to or greater than a predetermined value, the control device controls and drives the first motor actuator and the second motor actuator in a direction identical to the rotation direction of the steering wheel.

11. The steering device as claimed in claim 9, wherein the second output shaft is connected to a steering column; the second motor actuator is provided to the steering column; and the second motor actuator is arranged to provide a steering force to the steering column.

12. The steering device as claimed in claim 9, wherein the control device comprises a first control device configured to control and drive the first motor actuator, and a second control device configured to control and drive the second motor actuator; the first control device includes a first microcomputer configured to calculate a command signal outputted to the first motor actuator; and the second control device includes a second microcomputer configured to calculate a command signal outputted to the second motor actuator.

13. The steering device as claimed in claim 12, wherein the first motor actuator and the second motor actuator are configured such that when one of the first motor actuator and the second motor actuator malfunctions, the other of the first motor actuator and the second motor actuator continues to be controlled and driven.

14. The steering device as claimed in claim 12, wherein the first motor actuator and the second motor actuator are configured such that when one of the first microcomputer and the second microcomputer malfunctions, the other of the first microcomputer and the second microcomputer continues to be controlled and driven.

\* \* \* \* \*